United States Patent
Niu et al.

(10) Patent No.: US 10,082,816 B2
(45) Date of Patent: Sep. 25, 2018

(54) METHOD OF DIFFERENTIAL PROTECTION IN THE POWER DISTRIBUTION NETWORKS BASED ON PHASE DIFFERENCE PRINCIPLES

(71) Applicants: XJ GROUP CORPORATION, Xuchang (CN); XJ ELECTRIC CO.,LTD, Xuchang (CN); XUCHANG XJ SOFTWARE TECHNOLOGIES LTD, Xuchang (CN); JIANGSU ELECTRIC POWER COMPANY RESEARCH INSTITUTE, Nanjing (CN); STATE GRID CORPORATION OF CHINA, Beijing (CN)

(72) Inventors: Qiang Niu, Xuchang (CN); Jingwan Liang, Xuchang (CN); Shuai Jiang, Xuchang (CN); Junhong Qiu, Xuchang (CN); Huawei Jia, Xuchang (CN); Meng Li, Xuchang (CN); Lei Gao, Xuchang (CN); Yongjian Tao, Xuchang (CN); Yongxin Liu, Xuchang (CN); Feng Li, Xuchang (CN); Xintao Dong, Xuchang (CN); Yake Xi, Xuchang (CN)

(73) Assignees: XJ GROUP CORPORATION, Xuchang (CN); XJ ELECTRIC CO., LTD, Xuchang (CN); XUCHANG XJ SOFTWARE TECHNOLOGIES LTD, Xuchang (CN); JIANGSU ELECTRIC POWER COMPANY RESEARCH INSTITUTE, Nanjing (CN); STATE GRID CORPORATION OF CHINA, Beijing (CN)

( * ) Notice: Subject to any disclaimer, the term of this patent is extended or adjusted under 35 U.S.C. 154(b) by 176 days.

(21) Appl. No.: 15/076,638

(22) Filed: Mar. 21, 2016

(65) Prior Publication Data
US 2017/0038785 A1   Feb. 9, 2017

(30) Foreign Application Priority Data

Aug. 7, 2015   (CN) .......................... 2015 1 0481919

(51) Int. Cl.
G05F 1/66     (2006.01)
G05B 15/02    (2006.01)
H02H 3/26     (2006.01)

(52) U.S. Cl.
CPC ............... *G05F 1/66* (2013.01); *G05B 15/02* (2013.01); *H02H 3/265* (2013.01)

(58) Field of Classification Search
CPC ............ G05F 1/66; G05B 15/02; H02H 3/265
(Continued)

(56) References Cited

U.S. PATENT DOCUMENTS

2004/0130838 A1* 7/2004 Papallo ................. H02H 7/261
                                                    361/62
2008/0211511 A1* 9/2008 Choi .................... G01R 31/086
                                                    324/522

(Continued)

FOREIGN PATENT DOCUMENTS

CN            202309231 U   *   7/2012

*Primary Examiner* — Robert E Fennema
*Assistant Examiner* — Jigneshkumar C Patel
(74) *Attorney, Agent, or Firm* — Platinum Intellectual Property LLP

(57) ABSTRACT

The invention relates to a method of differential protection in the power distribution networks based on phase difference principles. The method comprises the following steps: collecting the current and voltage signals of each loading switch; calculating phase difference between the corresponding currents at two adjacent loading switches, wherein at least one of the two adjacent loading switches accords with $\Delta I_{\varphi\,max} > n \cdot \Delta I_T + \Delta I_{dz}$; tripping the two adjacent loading switches if the phase difference corresponding to the two adjacent loading switches being greater than a threshold then (Continued)

a section between the two adjacent loading switches being determined as a fault section. The method only needs to calculate the phase difference between the corresponding currents at the two adjacent loading switches, and achieves the fault determination according to the phase difference being greater than the threshold. The method has low data synchronizing requirements, and processes the fault determination according to the collected signals. The time required for the entirely determining process is short, and a fast protecting response is achieved, thus the problem of slowly protecting response in the existing relay-protection method for the power distribution networks is solved.

3 Claims, 2 Drawing Sheets

(58) Field of Classification Search
USPC .......................................................... 700/292
See application file for complete search history.

(56) References Cited

U.S. PATENT DOCUMENTS

| | | | | |
|---|---|---|---|---|
| 2010/0014198 | A1* | 1/2010 | Dusang, Jr. ............ | H02H 3/165 |
| | | | | 361/47 |
| 2011/0069421 | A1* | 3/2011 | Marmonier ............ | H02H 3/302 |
| | | | | 361/93.1 |
| 2012/0286587 | A1* | 11/2012 | Zhou ...................... | H02H 7/263 |
| | | | | 307/113 |

* cited by examiner

METHOD OF DIFFERENTIAL PROTECTION IN THE POWER DISTRIBUTION NETWORKS BASED ON PHASE DIFFERENCE PRINCIPLES

FIELD OF THE INVENTION

The invention relates to a method of differential protection in the power distribution networks based on phase difference principles, it belongs to the power distribution networks differential protection technology.

BACKGROUND OF THE INVENTION

For a long time, the construction of the medium and low voltage distribution networks is far lagging behind the high voltage power transmission system, the medium and low voltage distribution networks exists problems of weak grid structure and low level of automation. As more and more distributed photovoltaic power access to the power distribution networks, it is bound to produce profound effect on the present relay-protection and automation of the distribution networks. The relay-protection theory of the power distribution networks needs to be improved to promote the performance of the relay-protection.

At present, the power distribution networks has equipped with an active defensive current protection and a passive master station type distribution automatic self-healing control system, which is in order to ensure that the power distribution networks fault isolation and recovery, but it has many problems. The active defensive current protection of the traditional distribution networks usually ensure the selectivity of the action through time coordination. When the protection series is excessive (such as 3 levels), which may lead the time of the protection operation of the last protection series (a circuit breaker of a substation export) is too long (longer than 1 s), the persistent short-circuit current and the resulting voltage collapse may threat the safety of the power distribution networks, the voltage quality and the normal operation of the sensitive power load.

The master station type distribution automatic self-healing control system focus on the coordinated control of the switches, relay-protection devices, etc. Because it is a passive type of the self-healing control after traditional relay-protection action of distribution networks, it not only inherits the characteristic of the traditional overcurrent protection that the action time is too long, but also has the problem of poor accuracy and long-time of "Offline strategy, real-time control", which eventually lead to a longer time of the self-healing process of the power distribution networks, and not conducive to ensure the quality of power supply of the power distribution networks.

The big data interaction of wide-area layer is one of the development directions of new techniques of the power distribution networks protection. The traditional power communication system cannot meet the demands of the new technical application of the power distribution networks protection for technical system, transmission capacity, bandwidth, real-time, and so on, which restricts the development of new principles of distribution networks protection. SDH technology is the most widely used communication transmission technology in power system, and it is based on the time slot interchange, wherein each service occupies fixed time slot, even if there is no service delivery on the channel, the bandwidth and will not be released, the utilization of the bandwidth is low, and networking flexibility is not enough, data exchange couldn't be achieved with high capacity and high real-time within the scope of the wide area.

At present, some domestic scholars and equipment manufacturers raised solutions of the differential protection and the self-healing of the power distribution networks, which has solved the problems of poor selectivity, long action time, and poor efficiency of the self-healing of the power distribution networks protection in a certain extent.

As an invention patent whose authorized number is CN1167176, is entitled "Relay-Protection of the power distribution networks and Fault Location System", it disclosed a technique of relay protection of the power distribution networks and fault location. The invention determines whether the device is faulty by detecting and comparing the similarities and differences of the polarities of all the fault component currents flowing through the protected distribution equipment, to determine whether the equipment is fault; and then connecting all relays of the protected device by means of communication, in order to achieve the relay protection of all the distribution lines, power distribution bus and distribution transformers; and then transferring these current polarity information to the dispatch center, so the staff can quickly find the fault location to achieve the fault location rapidly. The patent has the following 3 limitations:

1) The patent is limited to the technical conditions of the power distribution networks at the time, which compares the positive and negative polarity of the current by using the old conventional relay of the beginning of this century, has been unable to adapt to the development of technology in today's distribution networks, and no longer applicable to the construction of the smart distribution networks.

2) The invention patent determines fault sections by comparing the polarity of each polarity comparison relay and determining whether the polarity of each polarity comparison relay is the same (all positive or all negative). The combination of each adjacent elements of relay constitute a large segment protection, but it requires the corporation of a large number of relays to achieve the protection function, incorrect determinations or faults of any polarity comparison relay will lead to protection malfunction or refuse operation, and reduces the four properties of relay-protection.

3) The invention patent need to build a private communications channel between the adjacent elements, in order to compare the polarity of each current, but the its cost too much and its communication rate of is slow.

As an another invention patent whose application number is 201410114922.5, is entitled "Petal-type Distribution Networks Protection and Control System", it disclosed a kind of petal-type distribution networks protection and control system, the petal-type distribution networks protection and control system includes a master station level, a regional level and a spacer layer; the master station level includes an automated master station, the regional level includes a regional control main station and a centralized protection terminal, wherein the regional control master station is set in the substation, the centralized protection terminal is set in the distribution room, spacer layer includes a centralized protection terminal and a longitudinal protection device, the centralized protection terminal is used to protect all intervals in the distribution room except for incoming lines and outgoing lines, the longitudinal protection device is used to protect incoming lines, outgoing lines and linking-up roads, the regional control master station, the centralized protection terminal and the longitudinal protection device are connected. The patent has the following 3 limitations:

1) In the invention, the centralized protection terminal is equipped with a longitudinal protection device, which requires a dedicated fiber channel constructed between adjacent elements. As element nodes of the power distribution networks is too many, which may lead a substantial increase in the investment of the communications networks, and make it not conducive to the promotion.

2) In the invention, the centralized protection terminal determines fault sections by contrasting the differences in current amplitudes, which is highly required in data synchronization between adjacent elements, the synchronization accuracy error is not allowed to exceed 1 s. Once the synchronization accuracy is not enough, it will lead to a malfunction, meanwhile, it will increase the investment in the synchronization system between adjacent nodes and reduce the economy.

3) In the invention, the centralized protection terminal transport action messages to the regional control main station, and regional control main station conducts self-healing after handing faults, resulting in too many steps long time of the self-healing.

To sum up, the problems of the existing differential protection in the power distribution networks and the self-healing after faults are lagging behind the development of distribution networks technology, the investment of fiber channels for adjacent components is too large, highly dependent on data synchronization, and too many steps of the self-healing. Aiming at the fast fault isolation and self-healing, it is imminent to explore a implementation method of differential protection and self-healing after faults with low cost, principle reliable, and fast action.

As the continuously improvement of communications technology, digital technology, networks control technology, with data processing capability of the power distribution networks terminals and intelligence level, revolutionary changes of the structure and morphology of the power distribution networks protection system have been promoted, which has promoted the organic combination multi-dimensionally and multi-levelly of the relay protection, the self-healing control system and so on, and get the operation information of the wide distribution networks by the functional integration of the same level and multi-level information exchange, to coordinate the coordination between protection and control, and analyzes and evaluates the protection criterion and control strategy, and make the global optimization to improve the existing protection performance, and optimize the control strategy.

Communication technology is an important foundation to achieve the innovation and breakthroughs of distribution networks protection technology. PTN technology supports a variety of two-way point-to-point connection based on packet-switched services, and has the networking capability which is suitable for all kinds of granular business and end to end, which has provided the more suitable "flexible" transmission pipeline for IP service feature and achieve the transport-level business protection and the recovery. Therefore, PTN high-speed data networks technology is more suitable for large amounts of data information exchange, and provides an important guarantee for the realization of wide-area differential protection control system of proactive distribution networks based on phase difference principles.

SUMMARY OF THE INVENTION

The purpose of the invention is to provide a method of differential protection in the power distribution networks based on phase difference principles, in order to solve the problem that the traditional differential protection in the power distribution networks has many drawbacks.

To achieve the above object, the invention compromise a method of differential protection in the power distribution networks based on phase difference principles, comprising the following steps:

1) collecting current and voltage signals of each loading switch;

2) calculating phase difference between the corresponding currents at two adjacent loading switches, wherein at least one of the two adjacent loading switches accords with $\Delta I_{\varphi\ max} > n \cdot \Delta I_T + \Delta I_{dz}$; $\Delta I_{\varphi\ max}$ is the maximum value among the 3 phase current mutation values of a corresponding loading switch, n is a set proportional value, $\Delta I_{dz}$ is a start value of phase current mutation, $\Delta I_T$ is a threshold value:

3) tripping the two adjacent loading switches if the phase difference corresponding to the two adjacent loading switches being greater than a threshold then a section between the two adjacent loading switches determined as a fault section.

The each loading switch equipped with an intelligent feeder terminal unit which collects the current and voltage signal of the corresponding loading switch, and output it to a control system; the control system performs data processing and makes a determination of protection.

The intelligent feeder terminal unit converts the collected current and voltage signal to an optical digital signal, and the intelligent feeder terminal unit outputs the optical digital signal to the control system through a high-speed fabric Ethernet.

The control system generates a corresponding protective control command, and outputs the command to each intelligent feeder terminal unit through a high-speed fiber optic Ethernet.

After the step 3), the method of differential protection comprising the following step: delaying a set time and then putting an interconnection switch into use.

The power distribution networks based on phase difference principles of claim 1, wherein the value of n being set as 1.25.

In the method of differential protection in the power distribution networks based on phase difference principles of the present invention provided, firstly collecting current and voltage signals of each loading switch; calculating phase differences of currents corresponding to two adjacent loading switches, wherein at least one of two adjacent loading switches accords with $\Delta I_{\varphi\ max} > n \cdot \Delta_T + \Delta I_{dz}$; $\Delta I_{\varphi\ max}$ is the maximum value among the 3 phase current mutation of a corresponding loading switch, n is a set proportional value, $\Delta I_{dz}$ is a start value of phase current mutation, $\Delta I_T$ is a threshold: performing protection action if the current phase corresponding to the two adjacent loading switches is greater than a threshold, and then a section between the two adjacent loading switches is a fault section.

The method only needs to calculate the phase difference between the corresponding currents at the two adjacent loading switches, and achieves the fault determination according to the phase difference being greater than the threshold. The method has low data synchronizing requirements, and processes the fault determination according to the collected signals. The time required for the entirely determining process is short, and a fast protecting response is achieved, thus the problem of slowly protecting response in the existing relay-protection method for the power distribution networks is solved.

What's more, the method of differential protection in the power distribution networks based on phase difference principles can determine a section where faults occurred. Precision of the method is high because tripping protections only performed in fault sections rather than normal sections, to guarantee normal operation of power supply of the normal sections, and improve the reliability of the power distribution networks.

DETAILED DESCRIPTION OF THE EMBODIMENT

Next, the applicants of the present invention will further present the invention in detail with the drawings.

Figure 1:
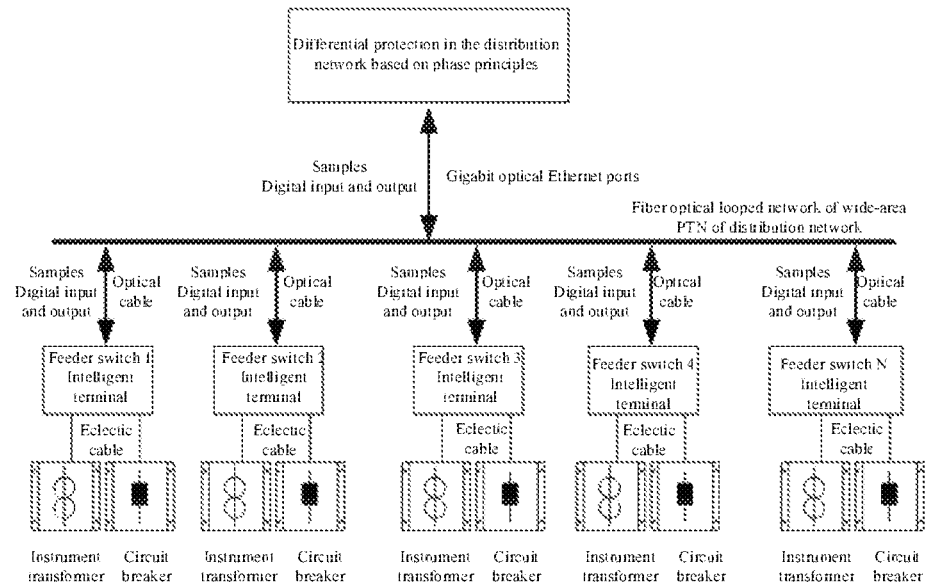
FIG. 1 is a frame diagram of wide-area differential protection control system of distribution networks technology.

As shown in FIG. 1, each loading switch equipped with an intelligent feeder terminal unit, wherein the intelligent feeder terminal unit collects the current and voltage signal of the loading switch by an instrument transformer, and the intelligent feeder terminal unit performing protection action by circuit breaker. Wide-area differential protection control system of distribution networks consists of a hardware and software module highly integrated device, and wide-area differential protection control system of distribution networks has a gigabit optical Ethernet ports, each intelligent feeder terminal unit connects the gigabit optical Ethernet ports by gigabit optical Ethernet. All of the intelligent feeder terminal units of the power distribution networks interact data information through a high-speed fabric Ethernet and the gigabit optical Ethernet ports on the wide-area differential protection control system. Wherein the high-speed fabric Ethernet along with gigabit optical Ethernet ports and fast optical Ethernet ports.

The method of the present invention of differential protection in the power distribution networks based on phase difference principles, comprising the following steps:

(1) The intelligent feeder terminal unit collects switching and analog signals of currents and voltage of a corresponding loading switch, and then converts the switching and analog signals of currents and voltage of a corresponding loading switch to internal digital signals by an analog/digital conversion plug; and then converts the internal digital signals to optical digital signals; finally outputs the optical digital signals by the fast optical Ethernet ports.

(2) The intelligent feeder terminal unit of each loading switch transmits data to the wide-area differential protection control system of power distribution networks through the high-speed fiber optic Ethernet. The wide-area differential protection control system of distribution networks of each loading switch is connected to the high-speed fiber optic Ethernet in accordance with the principle of partition, classification and the nearest access which transmits the data to the wide-area differential protection control system of distribution networks.

(3) The wide-area differential protection control system of power distribution networks gets current and voltage signal of each loading switch. Firstly, a protection logic module of the wide-area differential protection control system configures a starting component of a phase current mutation, its action equation is:

$$\Delta I_{\phi\ max} \rangle 1.25 \Delta I_T + \Delta I_{dz}$$

Wherein the $\Delta I_{\phi\ max}$ is the maximum value among the 3 phase current mutation of each loading switch; $\Delta I_{dz}$ is a start value of phase current mutation; $\Delta I_T$ is a floating threshold, it gradually increases with the increase of the amount of variation. In this example, the floating threshold is 1.25 times in order to ensure the threshold always higher than unbalanced output.

By detecting changes of instantaneous value of each phase current sampling in real-time can determine whether faults occurred. If there is a current accords with the equation above, then the protection logic module of the wide-area differential protection control system uses differential phase-separated differential based on phase difference principles to calculate phase differences of a corresponding current phase between two adjacent loading switches. When the phase differences is being calculated, a voltage is specified as a reference, and a direction is specified. For example, a substation export is designated as a benchmark, point loading switch is designated as a positive direction, calculating phase differences of currents corresponding to two adjacent loading switches, wherein at least one of the two adjacent loading switches accord with the equation above. If a phase difference is larger than a set phase difference value, then determining the section between the two adjacent loading switches as a fault section corresponding to the phase difference, the following action equation can be used:

$$|\Delta\theta| > \theta_{set}$$

Wherein the $\Delta\theta$ is a phase difference between adjacent loading switches, the $\theta_{set}$ is the set phase difference value.

After the calculation results meet an action condition, the differential protection control system of distribution networks carrying on a protection action, and tripping the load switch at both sides of the fault section. The wide-area differential protection control system of distribution networks sends protective tripping control commands to the intelligent feeder terminal unit through the high-speed fabric Ethernet, to realizing switch tripping on the fault section; then, after a certain period of time delayed, putting an interconnection switch into use, and restoring power supply of none-fault sections, to realize fast self-healing.

The wide-area differential protection control system of distribution networks realizes the fusion of protection based on phase difference principles and self-healing control function, over current protection of a traditional circuit breaker of a substation export Changed to backup protection of the power distribution networks, and each intelligent feeder terminal unit doesn't configure in situ conservation.

The method of differential protection use high-speed fabric Ethernet of high real-time, high bandwidth and high reliable to interact data, to meet the requirements of performance characteristic of relay protection action. The high-speed fabric Ethernet use a PTN technology, in order to provide important support for the wide-area differential protection control system based on phase difference principles. As a new-generation data transfer technology, the PTN technology has the characteristics of reliability, efficiency, redundancy, fault tolerance, manageability, adaptability, low latency and so on.

Figure 2:
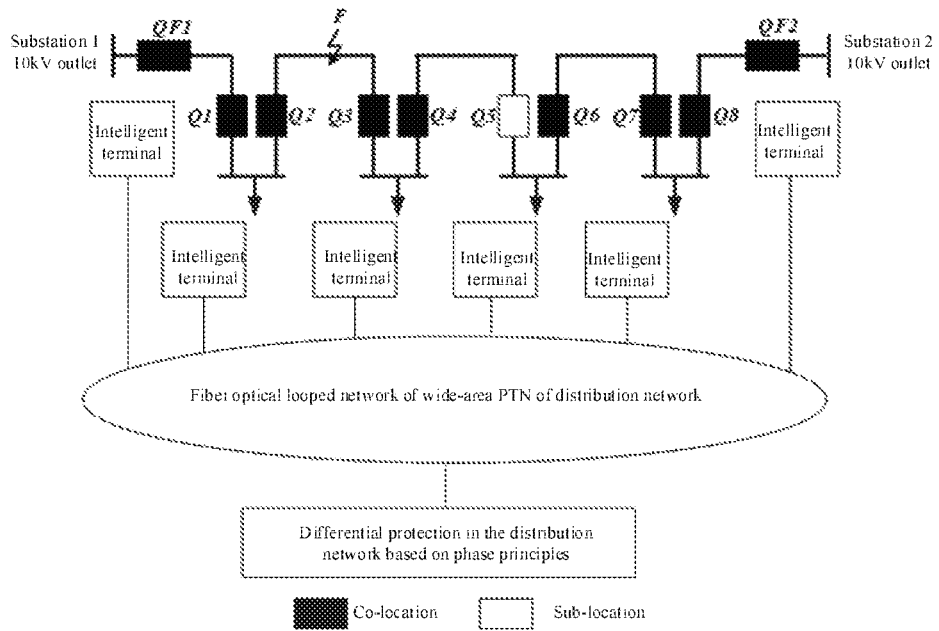
FIG. 2 is a schematic diagram of faults occurred at a point F on closed-loop distribution networks operated as open-loop.

A specific application example is given below:

As shown in FIG. 2, the power distribution network is a looped network operated as open-loop, switch Q5 is an interconnection switch. A voltage of a circuit breaker of a substation export 1 is specified as a reference, a direction pointed to loading switches is specified as a positive direction. When faults happened at a point F, there are short-circuit currents flowing through QF1, Q1 and Q2 rather than Q3~Q7. The wide-area differential protection control system of distribution networks process current and voltage signals corresponding to loading switches, and obtains the information that components of phase current mutations of QF1, Q1 and Q2 are open, then calculates phase angle difference of currents between QF1 and Q1, between Q1 and Q2 and between Q2 and Q3. The phase current of QF1, Q1 and Q2 are all the same, but there is no fault current flowing through Q3, so a current angle of Q3 is 0. The phase angle difference of currents between QF1 and Q1 is close to 0, so there is no faults between QF1 and Q1. The phase angle difference of currents between Q1 and Q2 is close to 0, so there is no faults between Q1 and Q2. Because faults occurred at Q2, a current angle of Q2 has a certain value. Because the current angle of Q3 is 0, the calculated phase angle difference of currents between Q2 and Q3 is larger than a set phase difference value, and a section between Q2 and Q3 is determined as a fault section. The wide-area differential protection control system of distribution networks issues a control instruction to trip switch Q2 and Q3, and cuts off the fault section.

Figure 3:
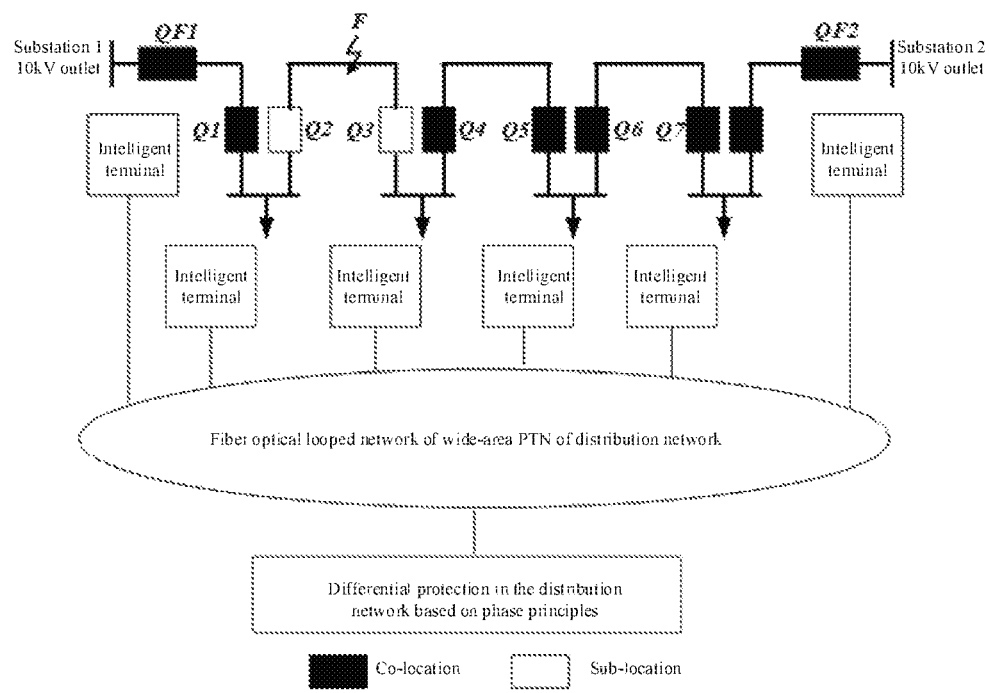
FIG. 3 is a schematic diagram of self-healing after faults occurred at the point F on closed-loop distribution networks operated as open-loop.

As shown in FIG. 3, after cutting off the fault section between Q2 and Q3, the wide-area differential protection control system of distribution networks puts the interconnection switch Q5 into use after delay, and recovers power supply of non-fault sections.

The n of the equation above is assigned as 1.25, and certainly not limited to 1.25, it can be set depending on the circumstances.

A specific mode of information transmission has been given in the embodiment above. And other embodiments are not limited to the specific mode of information transmission. For example, information can be transmitted by using general data transmission lines.

The specific embodiments have been given by the contents above, but the present invention is not limited to the embodiment as described. Basic ideas of the present invention is depend on basic schemes mentioned above, it does not take creative work for a person ordinarily skilled in the art to design models, formulas and parameters of various modifications according to teachings of the present invention. In the case that without departing from the principles and spirit of the invention, embodiment with changes, modifications, substitutions and modification still fall within the scope of protection of the invention. In addition, unspecified part of the description belongs to routine technologies for a person skilled in the art.

What is claimed is:

1. A method of differential protection in the power distribution networks based on phase difference principles, wherein the method comprising the following steps:
   1) collecting, via each intelligent feeder terminal unit in association with each loading switches, current and voltage signals of the each loading switch;
   2) converting, via each analog/digital conversion plug of the each intelligent feeder terminal unit, the collected current and voltage signals to optical digital signals;
   3) transmitting, via Ethernet, the optical digital signals to a differential protection control system;
   4) calculating, via a protection logic module of the differential protection control system, phase difference between the corresponding currents at each two adjacent loading switches, wherein at least one of the two adjacent loading switches accords with $\Delta I_{\phi\ max} > n \cdot \Delta I_T + \Delta I_{dz}$; $\Delta I_{\phi\ max}$ is the maximum value among the 3 phase current mutation values of a corresponding loading switch, n is a set proportional value, $\Delta I_{dz}$ is a start value of phase current mutation, $\Delta I_T$ is a threshold value;
   5) determining, via the differential protection control system, the phase difference corresponding to two adjacent loading switches being greater than a threshold;
   6) determining a section only between the two adjacent loading switches as a fault section;
   7) transmitting tripping control commands to one intelligent feeder terminal unit associated with the fault section; and
   8) tripping, via a circuit breaker of the one intelligent feeder terminal unit, the two adjacent loading switches, wherein each intelligent feeder terminal unit includes one circuit breaker, and wherein the value of n being set as 1.25.

2. The method of differential protection in the power distribution networks based on phase difference principles of claim 1, wherein the control system transmits tripping control commands through a high-speed fiber optic Ethernet.

3. The method of differential protection in the power distribution networks based on phase difference principles of claim 1, wherein after the step 8), the method of differential protection further comprising the following step:
   delaying a set time; and
   putting an interconnection switch into use.

* * * * *